(12) United States Patent
Wang

(10) Patent No.: US 8,619,113 B2
(45) Date of Patent: Dec. 31, 2013

(54) IMAGE PROCESSING SYSTEM AND IMAGE PROCESSING METHOD

(75) Inventor: Chen-Leh Wang, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 256 days.

(21) Appl. No.: 13/072,789

(22) Filed: Mar. 28, 2011

(65) Prior Publication Data

US 2012/0249722 A1    Oct. 4, 2012

(51) Int. Cl.
*H04N 7/14*    (2006.01)

(52) U.S. Cl.
USPC .................................................. 348/14.01

(58) Field of Classification Search
USPC ............................................ 348/14.01–14.08
See application file for complete search history.

(56) References Cited

U.S. PATENT DOCUMENTS

| | | | |
|---|---|---|---|
| 2003/0058334 A1* | 3/2003 | Boyden et al. | 348/14.08 |
| 2004/0223061 A1* | 11/2004 | Bear et al. | 348/207.99 |
| 2007/0040903 A1* | 2/2007 | Kawaguchi | 348/14.08 |
| 2007/0070177 A1* | 3/2007 | Christensen | 348/14.01 |
| 2009/0256901 A1* | 10/2009 | Mauchly et al. | 348/14.07 |
| 2010/0245586 A1* | 9/2010 | Terauchi et al. | 348/164 |

* cited by examiner

*Primary Examiner* — Maria El-Zoobi
(74) *Attorney, Agent, or Firm* — Winston Hsu; Scott Margo

(57) ABSTRACT

An image processing system and an image processing method are provided. The image processing system includes: a display device, an image detecting device, and a driving unit. The display device comprises: a frame, a display screen supported by the frame, and a sliding track positioned on the frame. The image detecting device is movably positioned on the sliding track via the driving unit, and utilized for detecting at least an object. The driving unit is utilized for moving the image detecting device. The image processing system and the image processing method can determine an optimal position for the image detecting device in the image processing system to detect the largest number of audiences. In addition, the image detecting device in the image processing system can detect objects in each zone in front of the display device in the image processing system no matter what size of the display device is.

19 Claims, 11 Drawing Sheets

IMAGE PROCESSING SYSTEM AND IMAGE PROCESSING METHOD

BACKGROUND

The disclosed embodiments of the present invention relate to an image processing system and an image processing method, and more particularly, to an image processing system and an image processing method which can determine an optimal position for the image detecting device in the image processing system to detect the largest number of audiences. In addition, the image detecting device in the image processing system can detect objects (such as human faces) in each zone in front of the display device in the image processing system.

Please refer to FIG. 1. FIG. 1 is a simplified diagram illustrating a conventional image processing system 100. The image processing system 100, for example, a television, comprises: a display device 110 and an image detecting device 120. The display device 110 comprises: a frame 112 and a display screen 114 supported by the frame 112. The image detecting device 120 is fixedly positioned on the frame 112. However, in the image processing system 100, the image detecting device 120 only can detect objects (such as human faces) in a specific zone (such as an intermediate zone in front of the display device 110, as shown in FIG. 2). The problem will be worse if the display device 110 is placed in an odd position or the users using the image processing system 100 are not in the specific zone. For example, if audience in a video conference is not in the specific zone (i.e., the intermediate zone shown in FIGS. 2 and 3), the image detecting device 120 can not detect the audience in the video conference, such as the objects in the left and right zones in FIG. 3.

In addition, the conventional image processing system 100 can not determine an optimal position for the image detecting device 120 to detect the largest number of audiences. For example, if most audiences in a video conference are not in the intermediate zone in front of the display device 110 but in a left zone or a right zone in front of the display device 110 (as shown in FIG. 4), the image detecting device 120 can only detect the audience in the intermediate zone but not the most of the audiences in the left zone or the right zone in front of the display device 110.

SUMMARY OF THE INVENTION

In accordance with exemplary embodiments of the present invention, an image processing system and an image processing method are proposed to solve the above-mentioned problem.

According to a first aspect of the present invention, an exemplary image processing system is disclosed. The image processing system comprises: a display device, a first image detecting device, and a driving unit. The display device comprises: a frame, a display screen supported by the frame, and a first sliding track positioned on the frame. The first image detecting device is movably positioned on the first sliding track via the driving unit, and utilized for detecting at least an object. The driving unit is coupled between the display device and the first image detecting device, and utilized for moving the first image detecting device.

According to a second aspect of the present invention, an exemplary image processing method is disclosed. The image processing method is applied to a display device having a frame and a display screen supported by the frame, and the method comprises: detecting at least an object by an image detecting device; and when no object is detected by the image detecting device and at least a user input signal is received by the display device, moving the image detecting device along a sliding track positioned on the frame.

According to a third aspect of the present invention, an exemplary image processing method is disclosed. The image processing method is applied to a display device having a frame and a display screen supported by the frame, and the method comprises: detecting a plurality of objects by an image detecting device; and moving the image detecting device along a sliding track positioned on the frame to calculate numbers of detected objects at a plurality of positions, respectively, and accordingly generate a plurality of detecting results.

Briefly summarized, the image processing system and the image processing method disclosed by the present invention are obviously capable of determining an optimal position for the image detecting device in the image processing system to detect the largest number of audiences. In addition, the image detecting device in the image processing system can detect objects (such as human faces) in each zone in front of the display device in the image processing system no matter what size of the display device is.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple/electrically connect" is intended to mean either an indirect or direct electrical connection. Accordingly, if one device is coupled to another device, that connection may be through a direct electrical connection, or through an indirect electrical connection via other devices and connections.

Figure 1:
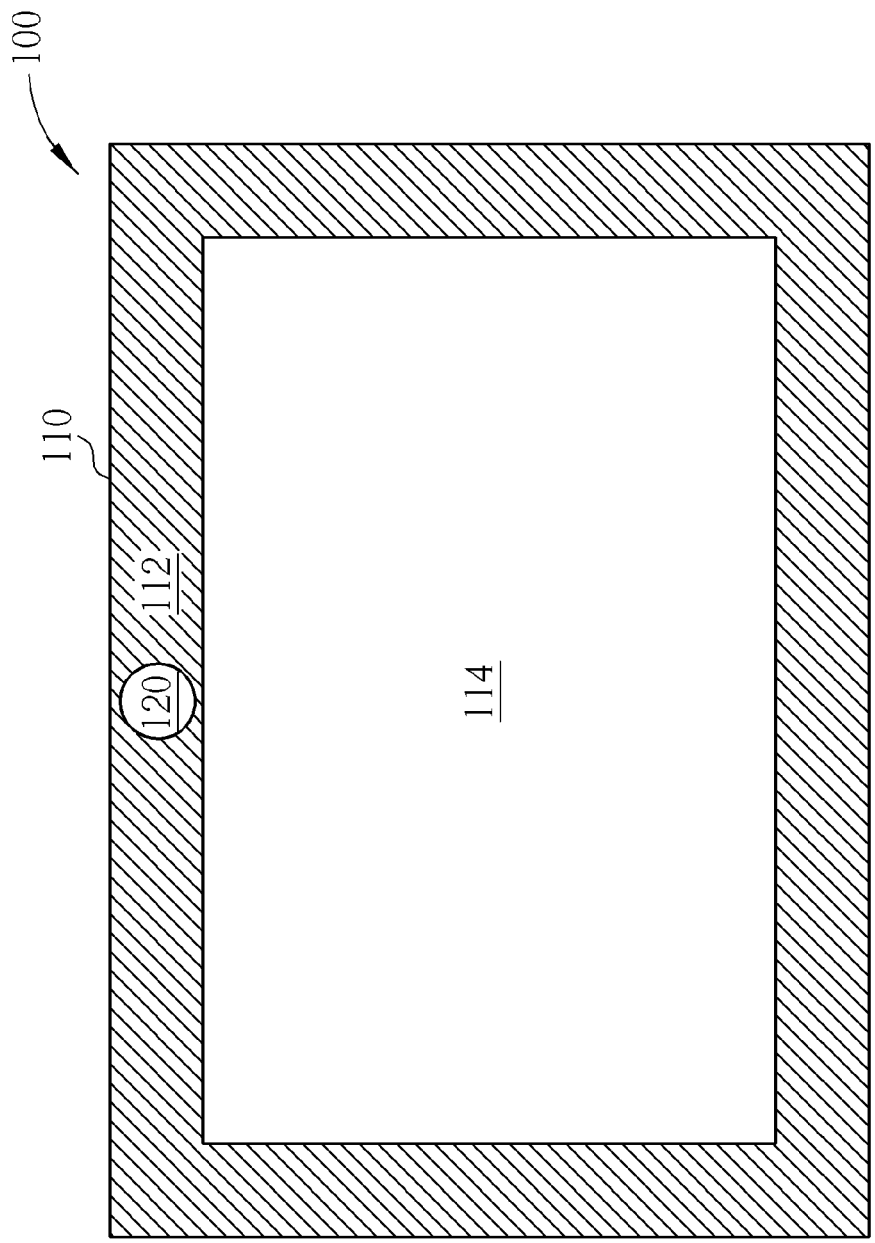
FIG. 1 is a simplified diagram illustrating a conventional image processing system.
Figure 2:
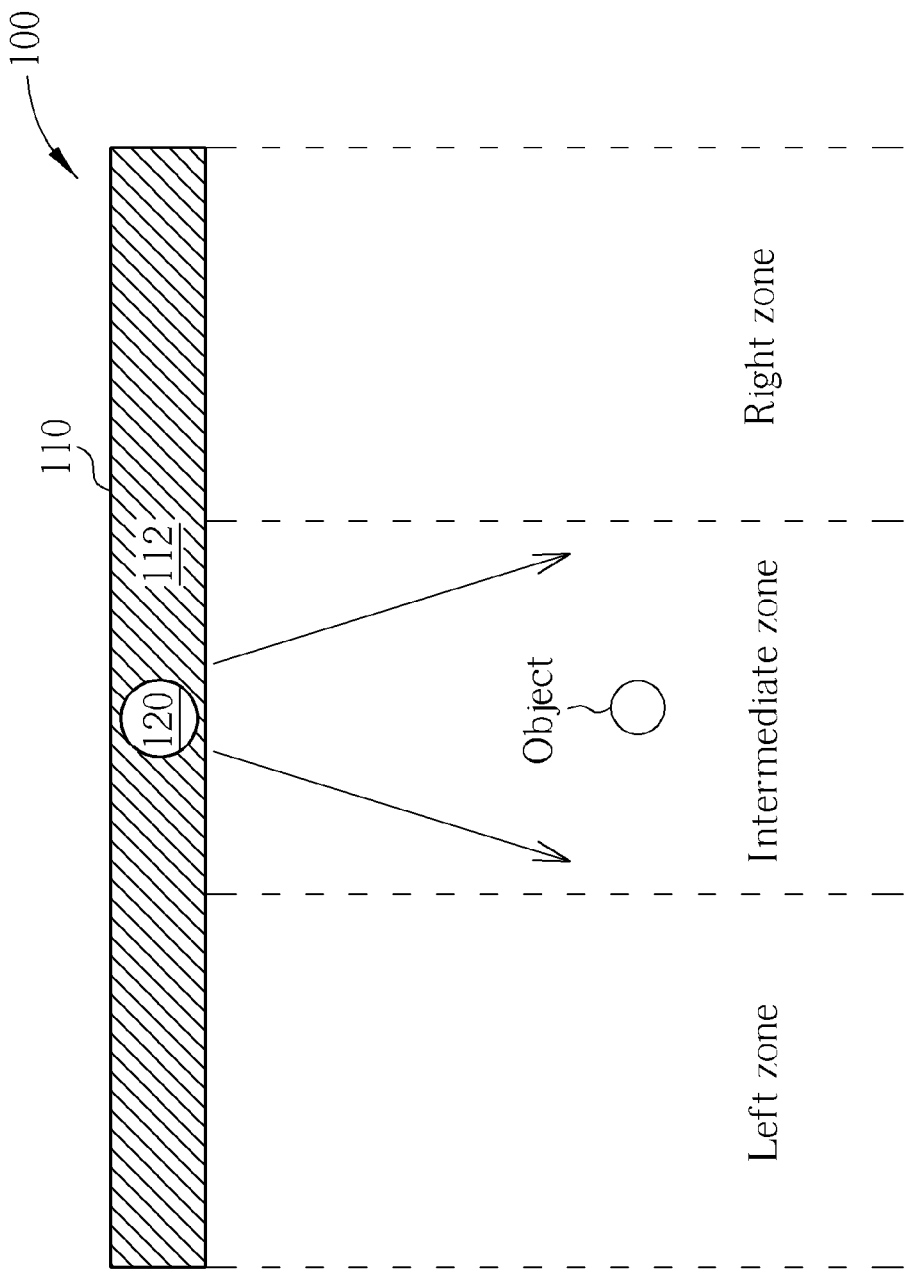
FIG. 2 is a simplified top-view diagram illustrating the conventional image processing system shown in FIG. 1.
Figure 3:
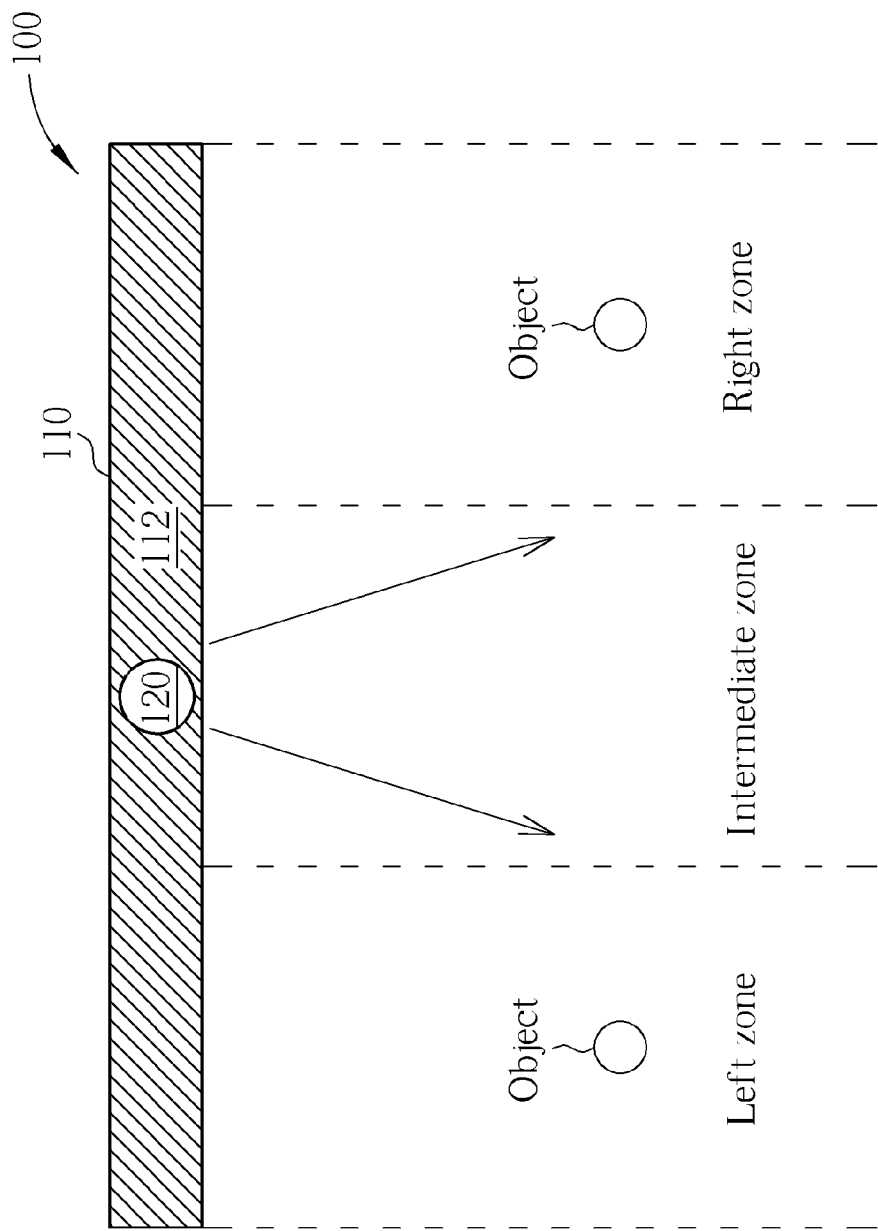
FIG. 3 is a simplified top-view diagram illustrating the conventional image processing system shown in FIG. 1.
Figure 4:
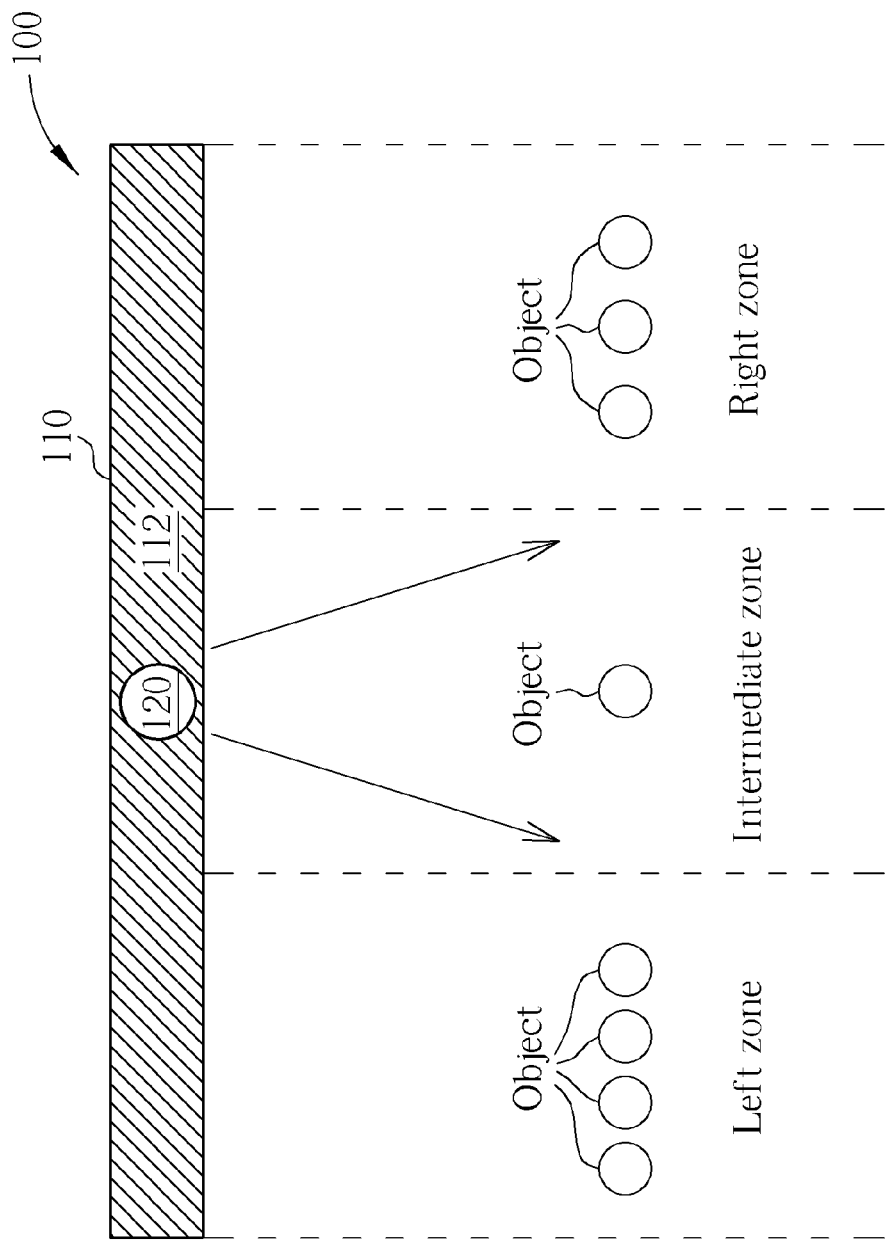
FIG. 4 is a simplified top-view diagram illustrating the conventional image processing system shown in FIG. 1.
Figure 5:
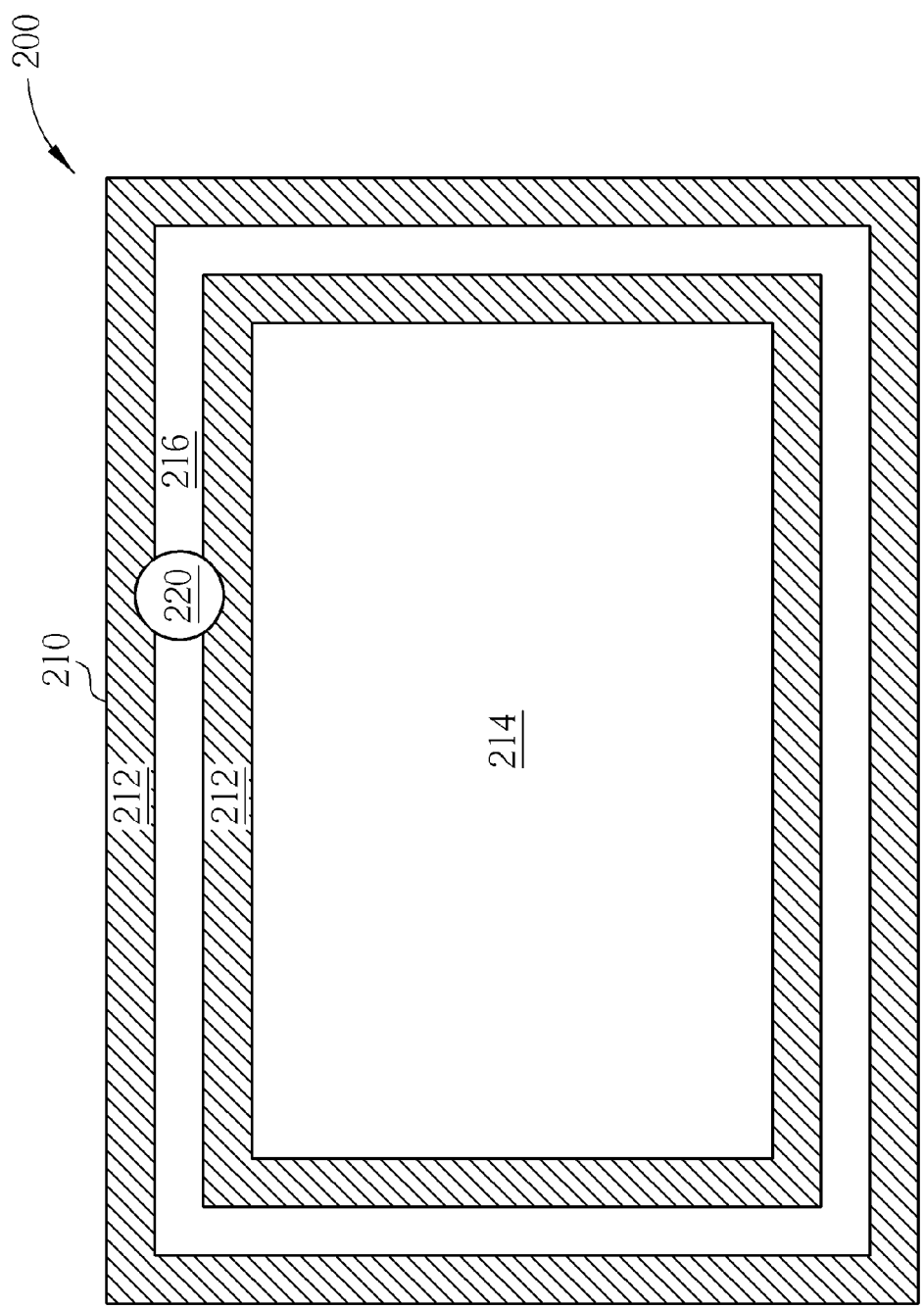
FIG. 5 is a simplified diagram illustrating an exemplary embodiment of an image processing system according to the present invention.
Figure 6:
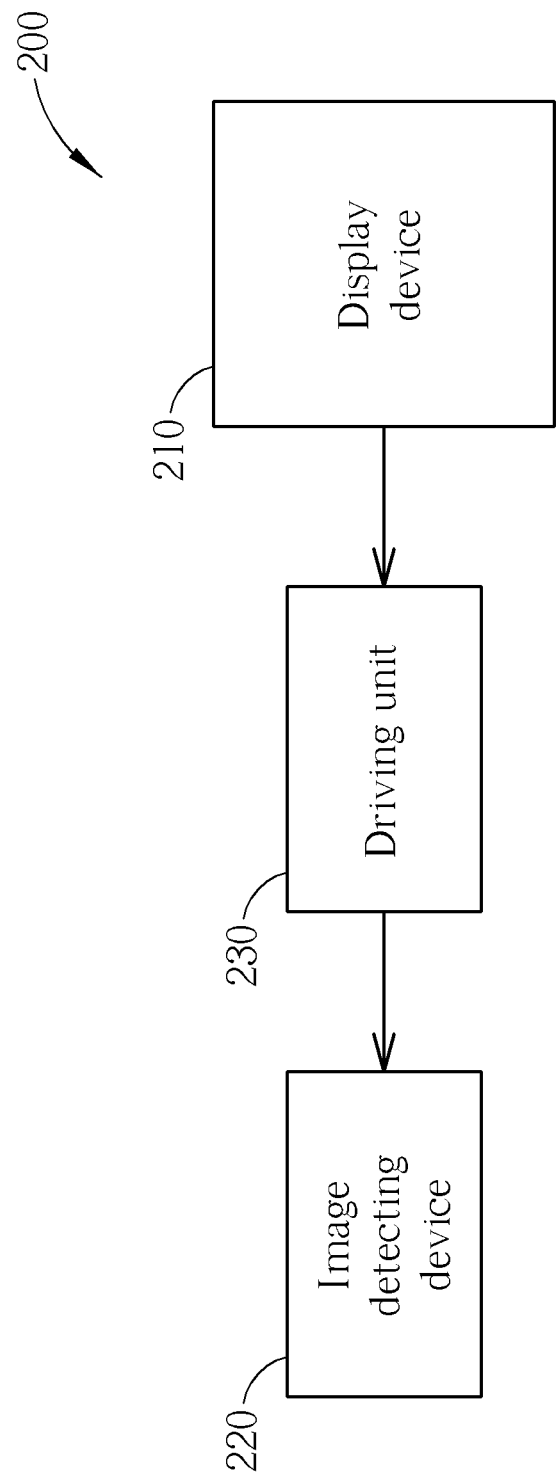
FIG. 6 is a block diagram of the image processing system shown in FIG. 5.

Please refer to FIG. 5 and FIG. 6. FIG. 5 is a simplified diagram illustrating an exemplary embodiment of an image processing system 200 according to the invention, and FIG. 6 is a block diagram of the image processing system 200. As shown in FIGS. 5 and 6, the image processing system 200 comprises: a display device 210, an image detecting device 220, and a driving unit 230, wherein the display device 210 can be a television or other display media, and the image detecting device 220 can be a camera or other detecting devices such as a thermal detector, etc. The display device 200 comprises: a frame 212, a display screen 214 supported by the frame 212, and a sliding track 216 positioned on the frame 212. The image detecting device 220 is movably positioned on the sliding track 216, and utilized for detecting at least an object, wherein the object can be a human face. The driving unit 230 is coupled between the display device 210 and the image detecting device 220, and utilized for moving the image detecting device 220, wherein the driving unit 230 can be a motor.

When the image detecting device 220 does not detect any object but the display device 210 receives at least a user input signal, the display device 210 will control the driving unit 230 to move the image detecting device 220 along the sliding track 216, allowing the image detecting device 220 to detect the object, wherein the user input signal can be a control signal for controlling an operation of the display device 210. For example, the user input signal can be a control signal generated from a remote control (not shown) of the display device 210, or an audience audio signal generated by at least a human. Further, the display device 210 can control the driving unit 230 to move the image detecting device 220 along the sliding track 216 until at least an object is detected.

When the image detecting device 220 detects the object after the display device 210 moves the image detecting device 220, the image detecting device 220 will generate a detecting result and the display device 210 will save the detecting result. Next, the display device 210 will analyze the detecting result and historical detecting result(s) to determine an optimal position for the image detecting device 220. For example, when the image detecting device 220 is applied to a face detection process for detecting a complete human face, the display device 210 will analyze a current detecting result and historical detecting result(s) to determine an optimal position for the face detection of the image detecting device 220.

Figure 7:
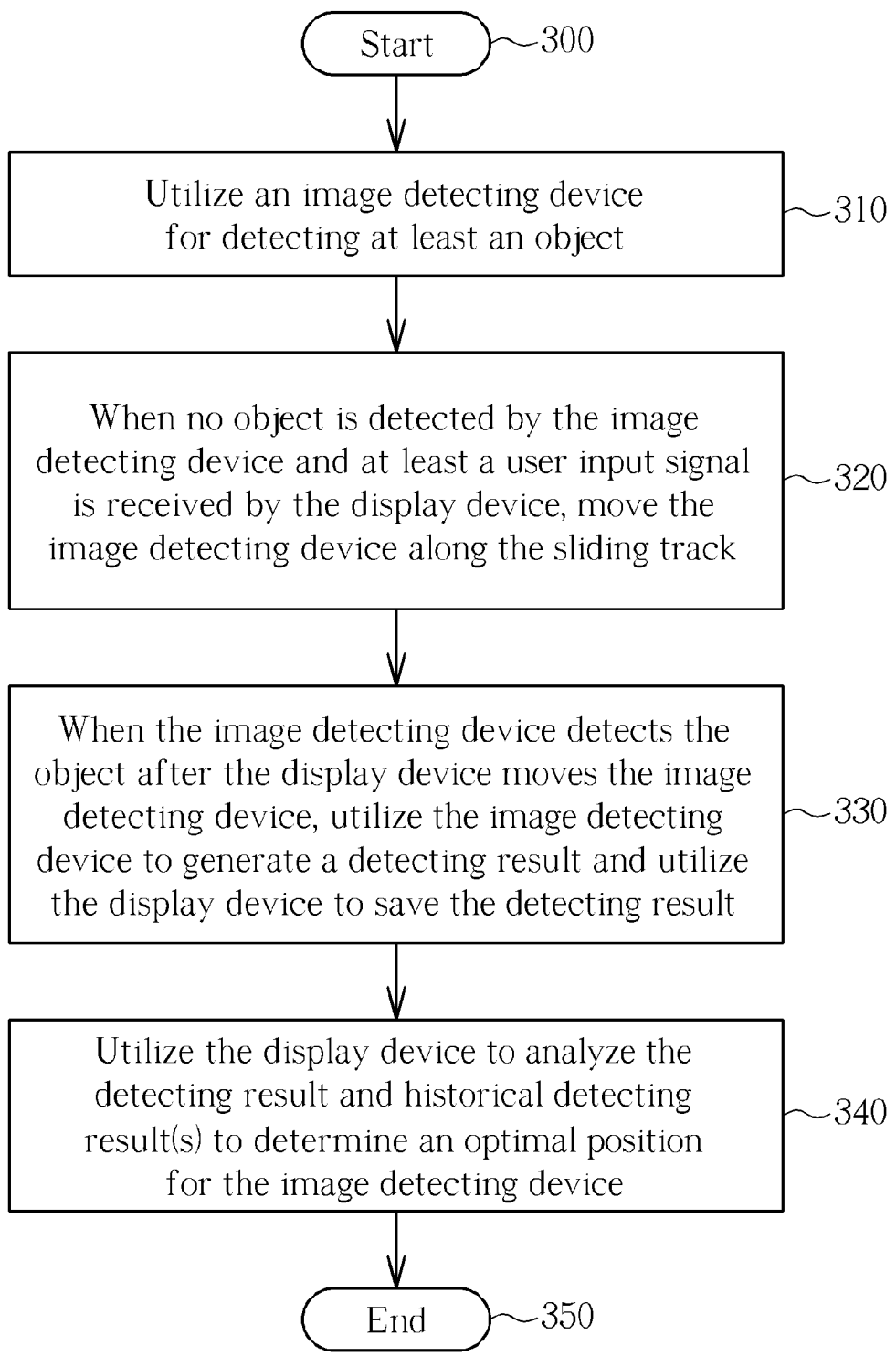
FIG. 7 is a flowchart showing an exemplary embodiment of an image processing method in accordance with the operation schemes of the image processing system shown in FIG. 5 and FIG. 6.

Please refer to FIG. 7. FIG. 7 is a flowchart showing an image processing method in accordance with the operation schemes of the image processing system 200 in the above embodiment. Provided that the result is substantially the same, the steps in FIG. 7 are not required to be executed in the exact order shown in FIG. 7. The image processing method in accordance with the above embodiment of the image processing system 200 in the present invention comprises the following steps:

Step 300: Start

Step 310: Utilize an image detecting device for detecting at least an object

Step 320: When no object is detected by the image detecting device and at least a user input signal is received by the display device, move the image detecting device along the sliding track.

Step 330: When the image detecting device detects the object after the display device moves the image detecting device, utilize the image detecting device to generate a detecting result and utilize the display device to save the detecting result Step 340: Utilize the display device to analyze the detecting result and historical detecting result(s) to determine an optimal position for the image detecting device Step 350: End In this way, in the image processing system 200, the image detecting device 220 can detect objects (such as human faces) in each zone in front of the display device 210 no matter what size of the display device 210 is. For example, if audience in a video conference is not in the intermediate zone in front of the display device 210 but in a left zone in front of the display device 210, the display device 210 can move the image detecting device 220 to the left side of the sliding track 216 so that the image detecting device 220 can detect the audience.

Figure 8:
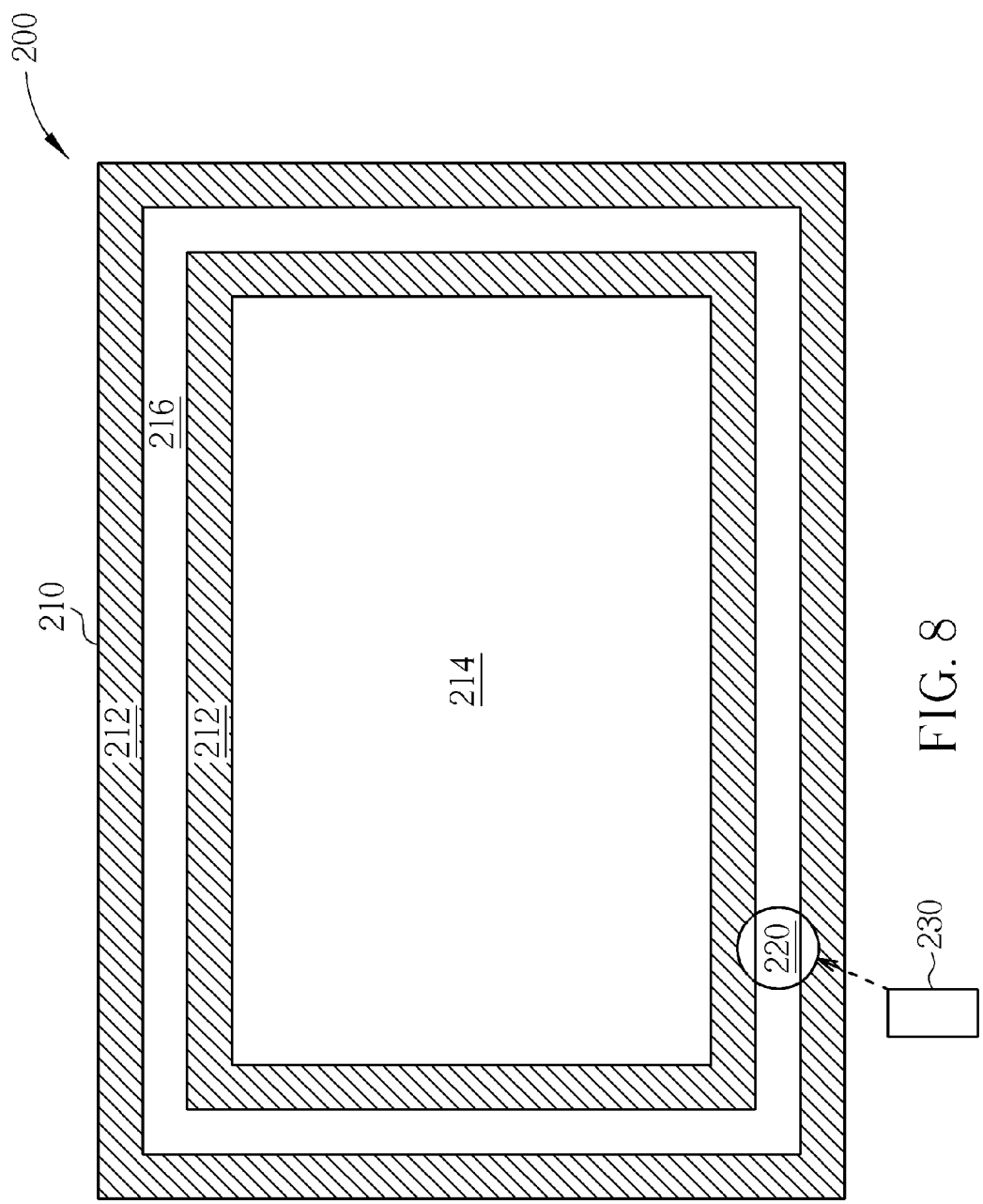
FIG. 8 is a simplified diagram illustrating another exemplary embodiment of an image processing system according to the present invention.

In another embodiment of the image processing system 200 of the present invention, the image detecting device 220 is utilized for detecting a plurality of objects, and the display device 210 controls the driving unit 230 to move the image detecting device 220 along the sliding track 216 to calculate numbers of detected objects at a plurality of positions, respectively, and accordingly generates a plurality of detecting results. In addition, the display device 210 can control the driving unit 230 to move the image detecting device 220 along the sliding track 216 according to a control signal generated by a remote control 230 (as shown in FIG. 8). Next, the display device will analyze the detecting results to determine an optimal position for the image detecting device 220. For example, when the image detecting device 220 is applied to an audience counting process for detecting audience as more as possible, the display device 210 will analyze the detecting results of different positions to determine an optimal position for detecting the largest number of audiences for the image detecting device 220.

Figure 9:
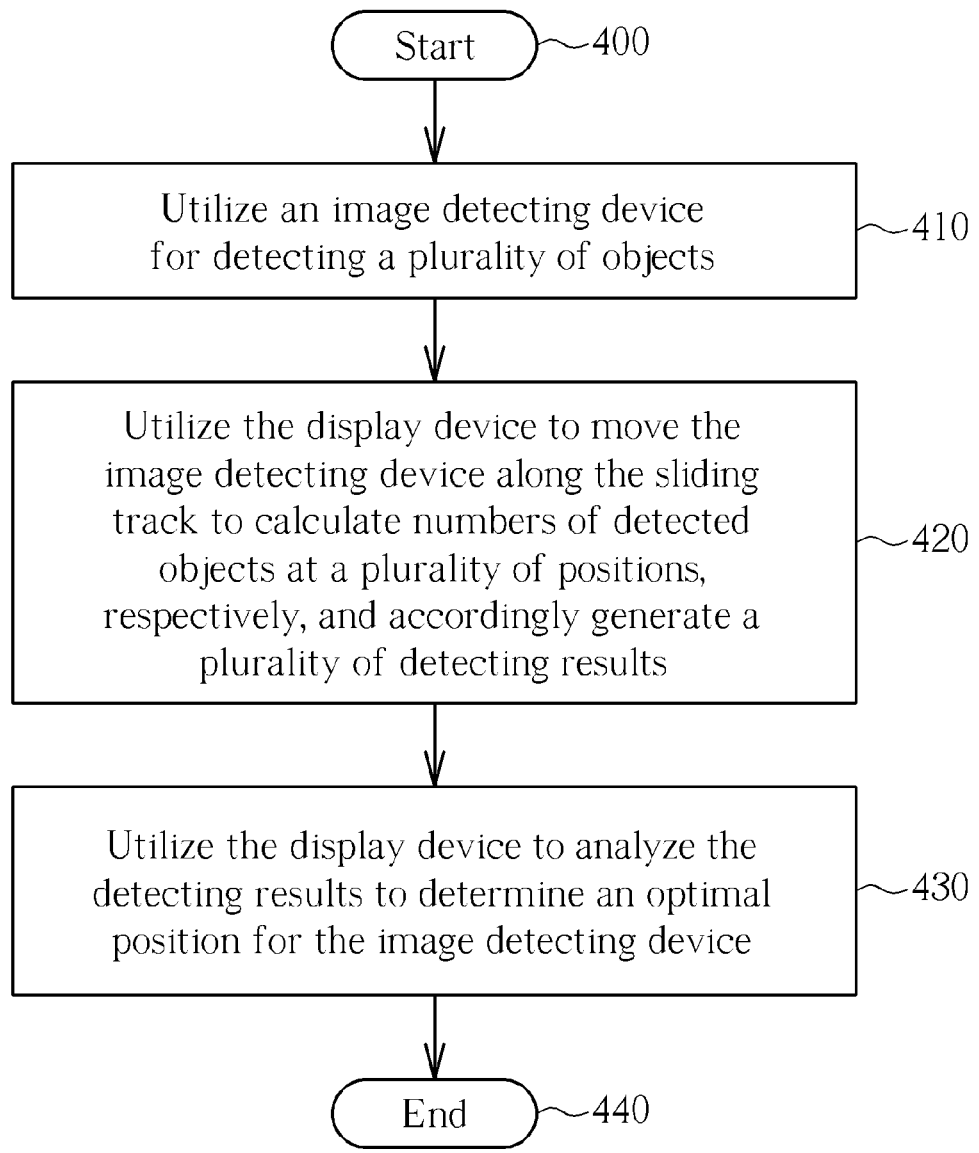
FIG. 9 is a flowchart showing another exemplary embodiment of an image processing method in accordance with the operation schemes of the image processing system shown in FIG. 5 and FIG. 6.

Please refer to FIG. 9. FIG. 9 is a flowchart showing an image processing method in accordance with the operation schemes of the image processing system 200 in the above embodiment. Provided that the result is substantially the same, the steps in FIG. 9 are not required to be executed in the exact order shown in FIG. 9. The image processing method in accordance with the above embodiment of the image processing system 200 in the present invention comprises the following steps:

Step 400: Start.

Step 410: Utilize an image detecting device for detecting a plurality of objects.

Step 420: Utilize the display device to move the image detecting device along the sliding track to calculate numbers of detected objects at a plurality of positions, respectively, and accordingly generate a plurality of detecting results.

Step 430: Utilize the display device to analyze the detecting results to determine an optimal position for the image detecting device.

Step 440: End.

In this way, the image processing system 200 can determine an optimal position for the image detecting device 220 to detect the largest number of audiences. For example, if most audiences in a video conference are not in the intermediate zone in front of the display device 210 but in a right zone in front of the display device 210, the display device 210 can move the image detecting device 220 to the right side of the sliding track so that the image detecting device 220 can detect most of the audiences.

Figure 10:
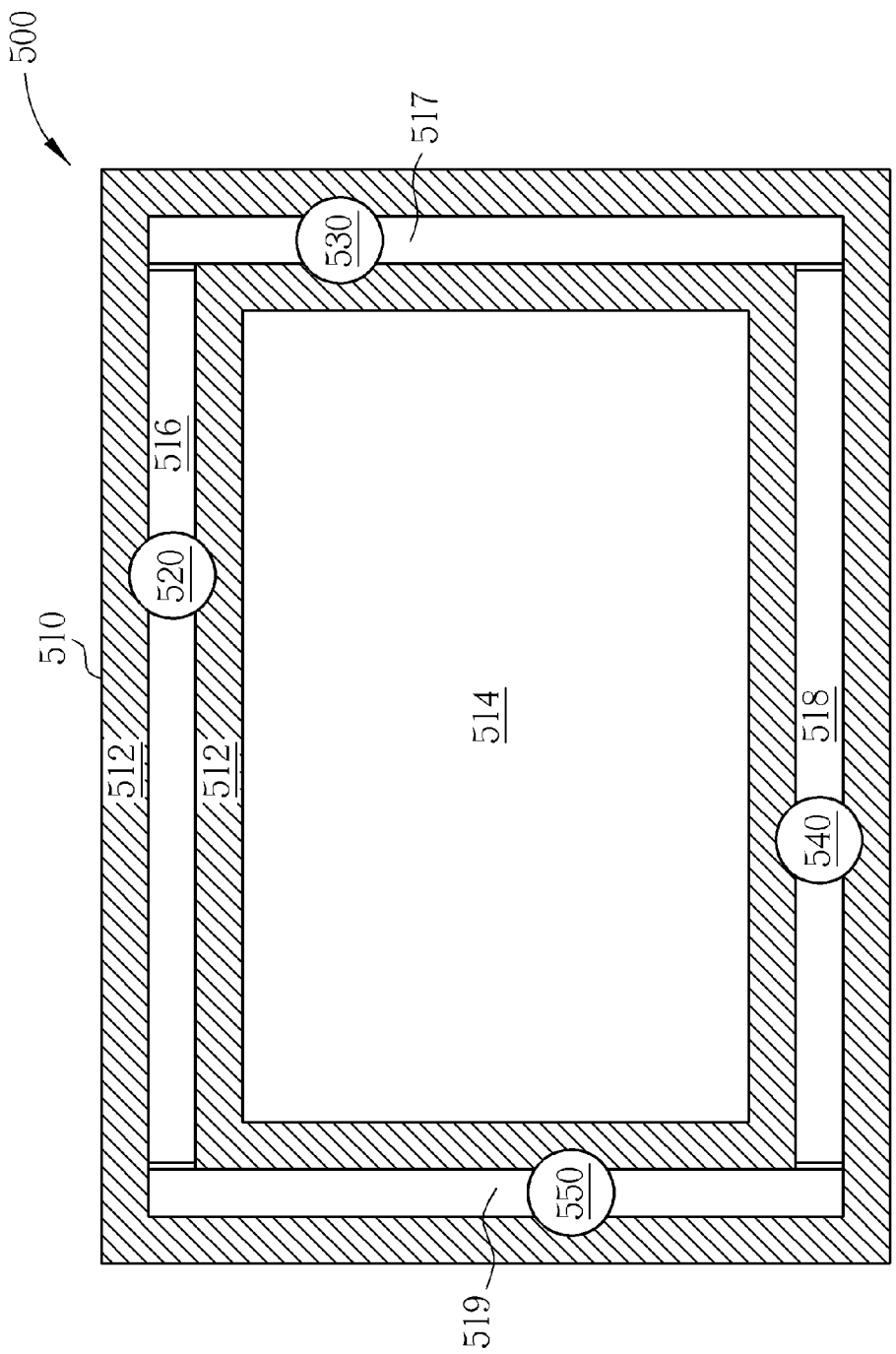
FIG. 10 is a simplified diagram illustrating another exemplary embodiment of an image processing system according to the present invention.
Figure 11:
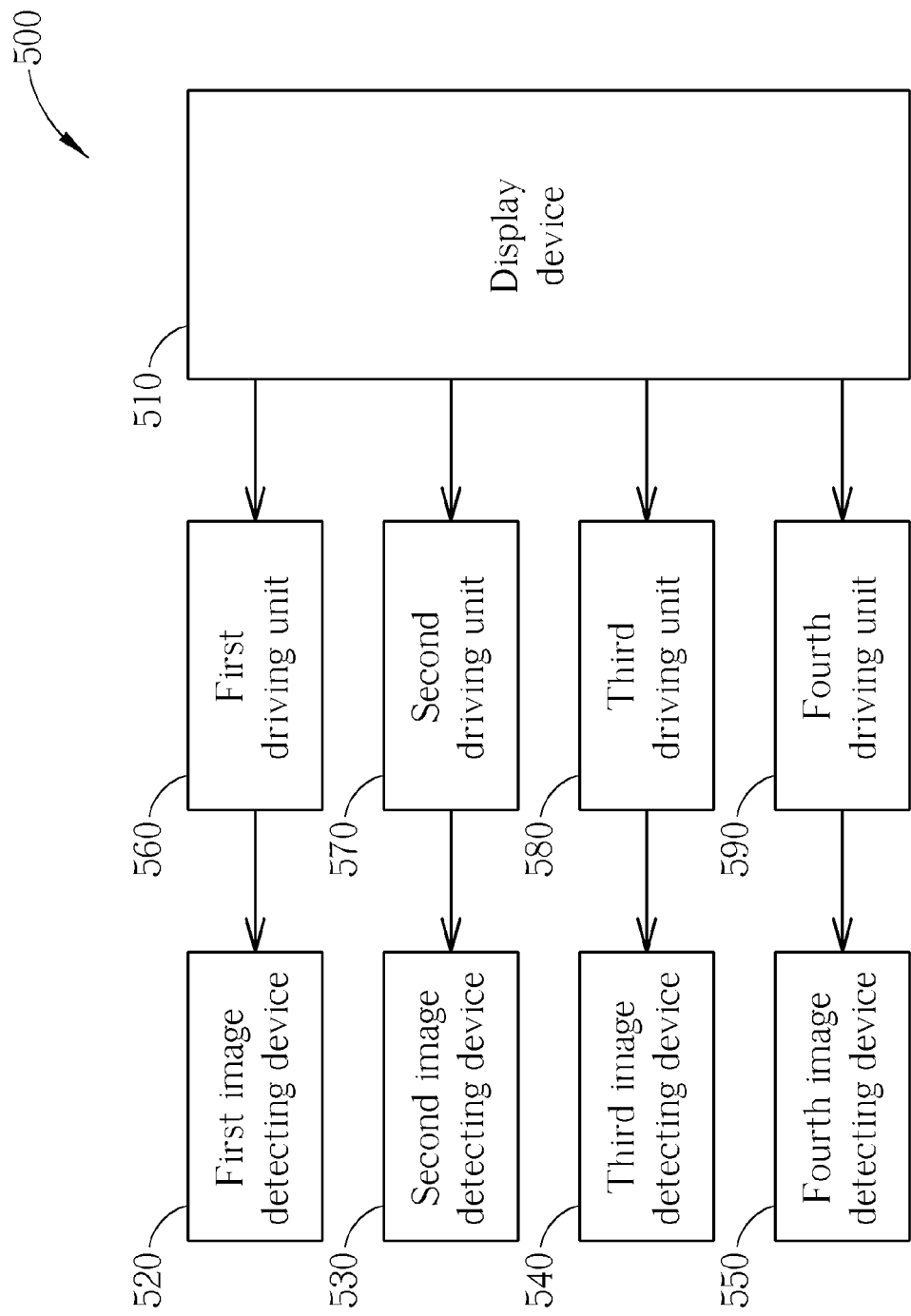
FIG. 11 is a block diagram of the image processing system shown in FIG. 10.

Please refer to FIGS. 10 and 11. FIG. 10 is a simplified diagram illustrating another exemplary embodiment of an image processing system 500 according to the present invention, and FIG. 11 is a block diagram of the image processing system 500. The image processing system 500 comprises: a display device 510, a first image detecting device 520, a second image detecting device 530, a third image detecting device 540, a fourth image detecting device 550, a first driving unit 560, a second driving unit 570, a third driving unit 580, and a fourth driving unit 590, wherein the display device 510 can be a television, and the first image detecting device 520, the second image detecting device 530, the third image detecting device 540, and the fourth image detecting device 550 can be cameras, and the first driving unit 560, the second driving unit 570, the third driving unit 580, and the fourth driving unit 590 can be motors. The display device 500 comprises: a frame 512, a display screen 514 supported by the frame 512, a first sliding track 516 positioned on the frame 512, a second sliding track 517 positioned on the frame 512, a third sliding track 518 positioned on the frame 512, and a fourth sliding track 519 positioned on the frame 512. The first image detecting device 520 is movably positioned on the first sliding track 516. The second image detecting device 530 is movably positioned on the second sliding track 517. The third image detecting device 540 is movably positioned on the third sliding track 518. The fourth image detecting device 550 is movably positioned on the fourth sliding track 519. The first driving unit 560 is coupled between the display device 510 and the first image detecting device 520. The second driving unit 570 is coupled between the display device 510 and the second image detecting device 530. The third driving unit 580 is coupled between the display device 510 and the third image detecting device 540. The fourth driving unit 590 is coupled between the display device 510 and the fourth image detecting device 550. The functions of the elements in the image processing system 500 are similar with those of the image processing system 200 shown in FIG. 5 and FIG. 6, and thus further explanation of the details and operations are omitted herein for the sake of brevity. In addition, please note that the above embodiments are only for illustrative purposes and are not meant to be a limitation of the present invention. For example, the numbers of the image detecting device, the driving unit, and the sliding track can be varied according to different design requirements.

Briefly summarized, the image processing system and the image processing method disclosed by the present invention are obviously capable of determining an optimal position for the image detecting device in the image processing system to detect the largest number of audiences. In addition, the image detecting device in the image processing system can detect objects (such as human faces) in each zone in front of the display device in the image processing system no matter what size of the display device is.

Those skilled in the art will readily observe that numerous modifications and alterations of the device and method may be made while retaining the teachings of the invention.

What is claimed is:

1. An image processing system, comprising:
   a display device, comprising:
   a frame, wherein the frame comprises a first side and a second side;
   a display screen, supported by the frame; and
   a first sliding track, positioned on one of the first side and the second side;
   a second sliding track positioned on another of the first side and the second side;
   a first image detecting device, movably positioned directly on the first sliding track, for detecting at least one object;
   a second image detecting device, movably positioned directly on the second sliding track, for detecting at least one object;
   a first driving unit, coupled between the display device and the first image detecting device, for moving the first image detecting device; and
   a second driving unit, coupled between the display device and the second image detecting device, for moving the second image detecting device.

2. The image processing system of claim 1, wherein when the first image detecting device does not detect any object but the display device receives at least one user input signal, the display device controls the first driving unit to move the first image detecting device along the first sliding track; and when the second image detecting device does not detect any object but the display device receives the at least one user input signal, the display device controls the second driving unit to move the second image detecting device along the second sliding track.

3. The image processing system of claim 2, wherein the object is a human face.

4. The image processing system of claim 2, wherein the user input signal is a remote control signal or an audio signal.

5. The image processing system of claim 2, wherein when the first image detecting device detects the object after the display device controls the first driving unit to move the first image detecting device, the first image detecting device generates a detecting result and the display device saves the detecting result; and when the second image detecting device detects the object after the display device controls the second driving unit to move the second image detecting device, the second image detecting device generates another detecting result and the display device saves the detecting result.

6. The image processing system of claim 5, wherein the display device further analyzes the detecting result and historical detecting result to determine an optimal position for the first or/and second image detecting device(s).

7. The image processing system of claim 1, wherein the first image detecting device is utilized for detecting a plurality of objects, and the display device controls the first driving unit to move the first image detecting device along the first sliding track to calculate numbers of detected objects at a plurality of positions, respectively, and accordingly generates a plurality of detecting results.

8. The image processing system of claim 7, wherein the display device further analyzes the detecting results to determine an optimal position for the first image detecting device.

9. The image processing system of claim 1, wherein the display device controls the first or/and second driving unit(s) to move the first or/and second image detecting device(s) along the first or/and second sliding track(s) according to a control signal generated by a remote control of the display device, correspondingly.

10. An image processing method applied to a display device having a frame and a display screen supported by the frame, wherein the frame comprises a first side and a second side, the method comprising:
   detecting at least one object by a first image detecting device positioned directly on a first sliding track which is positioned on one of the first side and the second side;

detecting at least one object by a second image detecting device positioned directly on a first sliding track which is positioned on another of the first side and the second side; and when no object is detected by the first and second image detecting devices and at least one user input signal is received by the display device, driving at least one of the first image detecting device and the second image detecting device to move along directly on the first and second sliding tracks positioned on the frame, correspondingly.

11. The image processing method of claim 10, wherein the object is a human face.

12. The image processing method of claim 10, wherein the first or second image detecting device is moved until detecting the object.

13. The image processing method of claim 10, wherein the user input signal is a control signal for controlling an operation of the display device.

14. The image processing method of claim 10, wherein the user input signal is a remote control signal or an audio signal.

15. The image processing method of claim 10, wherein when the first or/and second image detecting device detects the object, the method further comprises:

utilizing the first or/and second image detecting device(s) to generate a detecting result; and utilizing the display device to save the detecting result.

16. The image processing method of claim 15, further comprising:

analyzing the detecting result to determine an optimal position for the first or/and second image detecting device (s).

17. An image processing method applied to a display device having a frame and a display screen supported by the frame, the method comprising:

detecting a plurality of objects by a first image detecting device positioned directly on a first sliding track;

detecting a plurality of objects by a second image detecting device positioned directly on a second sliding track, wherein the second sliding track and the first sliding track are positioned on different sides of the frame; and moving at least one of the first and second image detecting devices along the first or/and second sliding track(s) positioned on the frame to calculate numbers of detected objects at a plurality of positions, respectively, and accordingly generate a plurality of detecting results.

18. The image processing method of claim 17, further comprising:

analyzing the detecting results to determine an optimal position for the first and second image detecting devices.

19. The image processing method of claim 17, wherein the step of moving the first or second image detecting device along the first or second sliding track comprises:

utilizing a remote control of the display device to move the first or second image detecting device along the first or second sliding track, correspondingly.

* * * * *